(12) United States Patent
Acosta

(10) Patent No.: US 7,353,930 B2
(45) Date of Patent: *Apr. 8, 2008

(54) BI-DIRECTIONAL FRICTION CLUTCH OR BRAKE ASSEMBLY FOR TRANSMISSIONS

(75) Inventor: Luis E. Acosta, Lawrenceville, GA (US)

(73) Assignee: Continental Automotive Systems US, Inc., Auburn Hills ( * ) Notice: Subject to any disclaimer, the term of this patent is extended or adjusted under 35 U.S.C. 154(b) by 245 days.

This patent is subject to a terminal disclaimer.

(21) Appl. No.: 11/341,841

(22) Filed: Jan. 27, 2006

(65) Prior Publication Data

US 2006/0175175 A1 Aug. 10, 2006

Related U.S. Application Data

(60) Provisional application No. 60/651,694, filed on Feb. 10, 2005.

(51) Int. Cl.
*F16H 57/10* (2006.01)

(52) U.S. Cl. ..................... 192/223; 192/12 B
(58) Field of Classification Search ................ 192/223, 192/55.1, 56.1, 12 B, 15
See application file for complete search history.

(56) References Cited

U.S. PATENT DOCUMENTS

| | | | |
|---|---|---|---|
| 4,848,627 A | 7/1989 | Maeda et al. ................ 224/275 |
| 5,246,151 A | 9/1993 | Jabara ..................... 224/42.42 |
| 5,316,368 A | 5/1994 | Arbisi ......................... 297/194 |
| 5,509,633 A | 4/1996 | Ruster et al. ............ 248/311.2 |
| 5,746,363 A | 5/1998 | Teller et al. ................. 224/547 |
| 6,050,468 A | 4/2000 | Kelley ......................... 224/542 |
| 6,185,868 B1* | 2/2001 | Kato .......................... 49/339 |
| 6,229,233 B1* | 5/2001 | Torii et al. ................. 310/75 R |
| 6,390,264 B2 | 5/2002 | Torii et al. |
| 6,435,600 B1* | 8/2002 | Long et al. .................. 296/155 |
| 6,659,257 B2* | 12/2003 | Hoshihara et al. .......... 192/223 |
| 6,688,443 B2* | 2/2004 | Liu .............................. 192/15 |
| 6,789,443 B1 | 9/2004 | Torii et al. |
| 6,908,135 B2 | 6/2005 | Stahmer et al. ............ 296/37.8 |
| 7,163,097 B2* | 1/2007 | Acosta .................... 192/223.2 |
| 2004/0129747 A1 | 7/2004 | Maierholzner .............. 224/544 |
| 2005/0051584 A1 | 3/2005 | Shelmon et al. ............ 224/275 |
| 2005/0248169 A1 | 11/2005 | Clark et al. .............. 296/24.34 |

FOREIGN PATENT DOCUMENTS

JP 05050876 3/1993

\* cited by examiner

*Primary Examiner*—David D. Le

(57) ABSTRACT

A clutch assembly 10 for use in a housing 26 has a race surface 32 and includes a shaft 13; an output structure 11; a cam 16; and a clutch plate 18. Follower structure 28 is associated with the cam. An input structure 14 is mounted on the shaft for rotation with respect to the shaft. The input structure 14 receives an input motion such that rotation of the input structure causes rotation of the cam 16 and shaft 13 so as to drive the output structure 11. During a back drive condition of the motor, when the output structure 11 is driving and torque is transmitted to the shaft 13 and thus to the cam 16, the cam causes the follower structure 28 to contact and exert pressure on the race surface 32 thereby preventing rotation of the shaft 13.

22 Claims, 5 Drawing Sheets

BI-DIRECTIONAL FRICTION CLUTCH OR BRAKE ASSEMBLY FOR TRANSMISSIONS

This application is based on U.S. Provisional Application No. 60/651,694 filed on Feb. 10, 2005 and claims the benefit thereof for priority purposes.

FIELD OF THE INVENTION

The invention relates to a bi-directional clutch or brake assembly for electric motors that becomes operational (engages) whenever an output gear side becomes the driving element.

BACKGROUND OF THE INVENTION

In motors, such as those having a worm and gear, there is a need to prevent the worm and gear from reaching a back driven condition in the event that an external torque is applied at an output end of a gear arrangement or transmission. When such a motor is coupled to a load, a driving torque will act on the motor output drive under certain conditions. This torque can be transmitted from the drive gear to the worm shaft inducing an angular motion on the motor armature (back drive). When this condition is reached, the system ceases to operate as intended; for example, in the case of a window lift motor, this can mean that the window moves downward from an original position without operator intervention under vibration conditions (driving the vehicle). Another scenario causing back drive could be an individual pushing down the glass to gain access to the vehicle.

Currently, back drive prevention is achieved by maintaining a lead angle below a friction angle in the case of worm and gear drives. However, this solution creates an inherent inefficiency in the system that may not be adequate under certain vibration conditions.

There is a need for a bi-directional friction clutch or brake that selectively locks a drive system so that the efficiency of the system can be increased without any major concerns for back drive of the system.

SUMMARY OF THE INVENTION

An object of the invention is to fulfill the need referred to above. In accordance with the principles of the present invention, this objective is achieved by providing a clutch assembly for use in a housing having a race surface. The clutch assembly includes a shaft; an output structure fixedly coupled to the shaft, the output structure being constructed and arranged to transmit motion thereof to another member; a cam fixedly coupled to the shaft; a clutch plate mounted on the shaft for rotation with respect to the shaft; follower structure operatively associated with the cam; and an input structure mounted on the shaft for rotation with respect to the shaft, the input structure being associated with the cam and the follower structure. The input structure is constructed and arranged to receive, in a normal operating condition, an input motion such that rotation of the input structure causes rotation of the cam and shaft so as to drive the output structure. During a back drive condition of the motor, when the output structure is driving and torque is transmitted to the shaft and thus to the cam, the cam causes the follower structure to contact and exert pressure on the race surface thereby preventing rotation of the shaft.

In accordance with another aspect of the invention, a method is provided to control back drive in a motor. The motor includes a housing having a race surface. The method provides a clutch assembly having a shaft, an output structure fixedly coupled to the shaft, the output structure being constructed and arranged to transmit motion thereof to another member, a cam fixedly coupled to the shaft, a clutch plate mounted on the shaft for rotation with respect to the shaft; follower structure operatively associated with the cam, and an input structure mounted on the shaft for rotation with respect to the shaft, the input structure being associated with the cam and the follower structure, the input structure being constructed and arranged to receive an input motion such that rotation of the input structure causes rotation of the cam and shaft so as to drive the output structure. During a back drive condition of the motor, when the output structure is a driving element and when torque is transmitted to the shaft and thus to the cam, the cam is permitted to cause the follower structure to contact and exert pressure on the race surface thereby preventing rotation of the shaft. During a normal operating condition of the motor, when the input structure is driven, the follower structure is prevented from contacting the race surface, thereby permitting the worm shaft to rotate freely.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
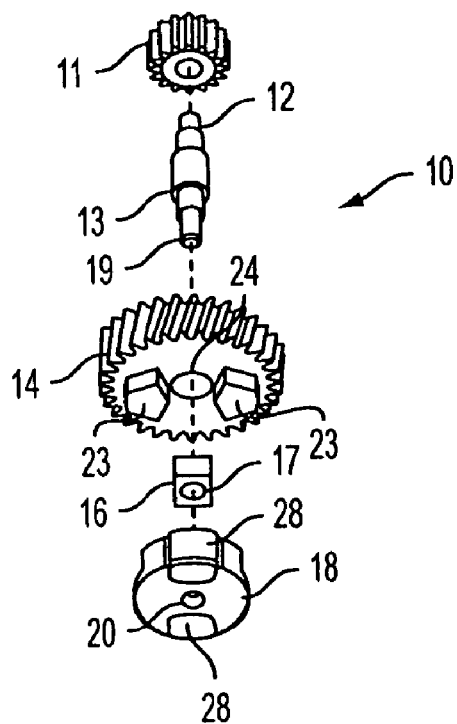
FIG. 1 is a bottom exploded view of a clutch assembly provided in accordance with the principles of the invention.

A brake or clutch assembly, generally indicated at 10, is shown in exploded view in FIG. 1 in accordance with the principles of the present invention. The clutch assembly 10 includes an output structure 11 fixedly mounted on an end 12 of a shaft 13, an input structure 14, a cam 16 and a clutch plate 18. In the illustrated embodiment, the input structure 14 and the output structure 11 each define gears, but it can be appreciated that these structures 14 and 11 can be configured as pulleys for use in a belt driven system.

Figure 3:
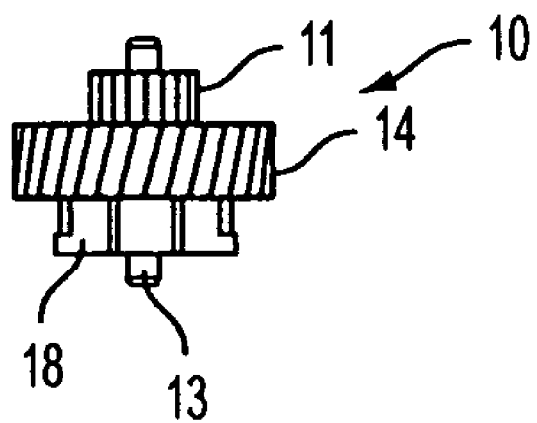
FIG. 3 is a front view of the assembled clutch assembly of FIG. 1.
Figure 8:
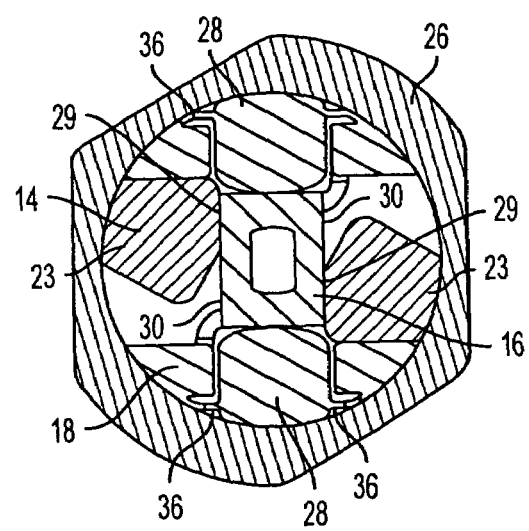
FIG. 8 is a sectional view of a housing containing the cam, the clutch plate and the input structure of the clutch assembly of the invention, shown when the input structure is the driving element.
Figure 9:
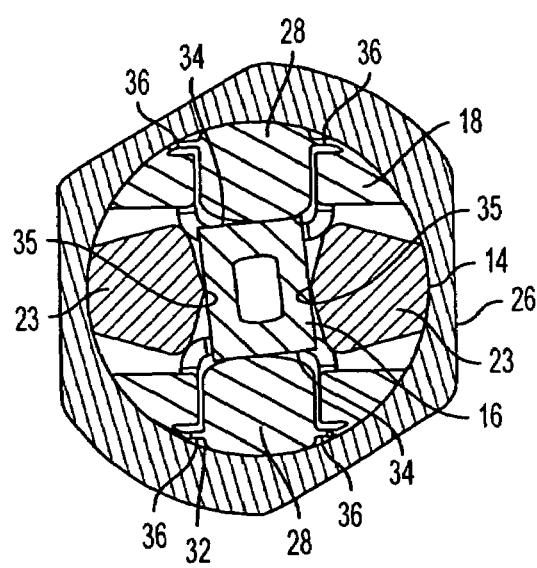
FIG. 9 is a sectional view of a housing containing the cam, the clutch plate and the input structure of the clutch assembly of the invention, shown when the output structure is the driving element.

The cam 16 has a bore 17 that receives end 19 of the shaft 13 in a fixed manner so that movement of the cam 16 moves the shaft 13. Shaft end 19 extends through a bore 20 in the clutch plate 18 so that the clutch plate 18 freely rotates about the shaft 13. The input structure 14 is mounted so as to freely rotate with respect to the shaft 13. The input structure 14 also includes engagement members 23 extending there from. With reference to FIGS. 8 and 9, each engagement member 23 has a pair of top surfaces 29 that meet to define an apex 35, the function of which with be explained below. The assembled clutch assembly is shown in FIG. 3.

Figure 4:
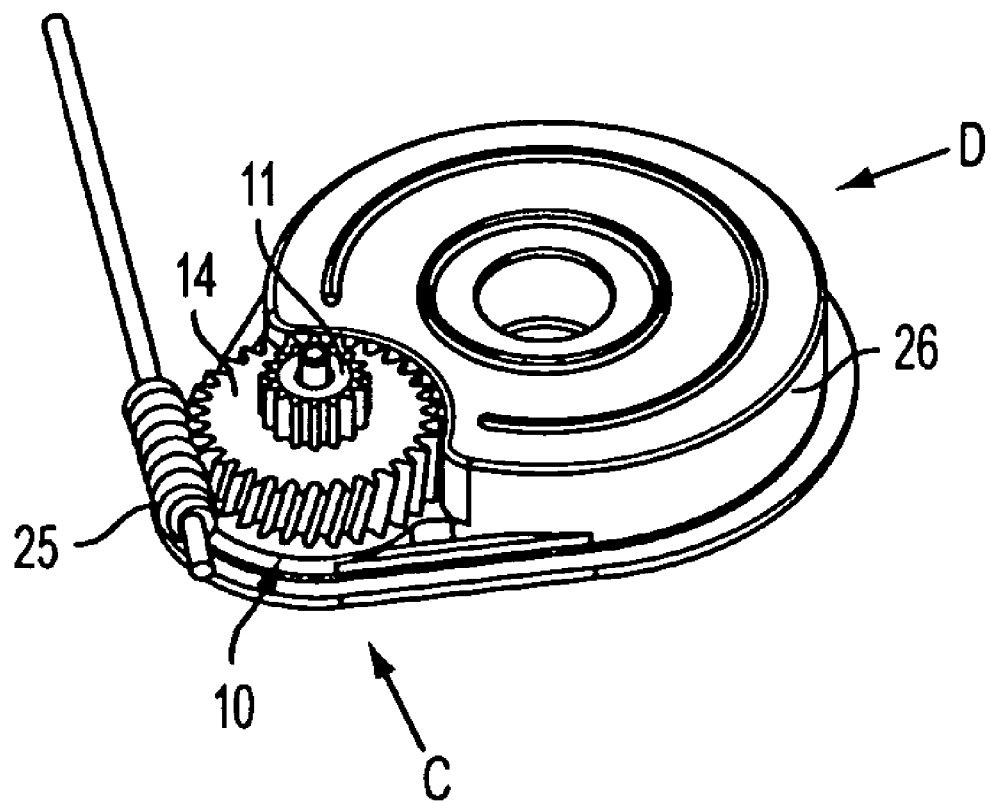
FIG. 4 is a view of the clutch assembly of FIG. 3 shown mounted in a housing and engaged with a worm gear and thus defining a transmission structure.
Figure 5:
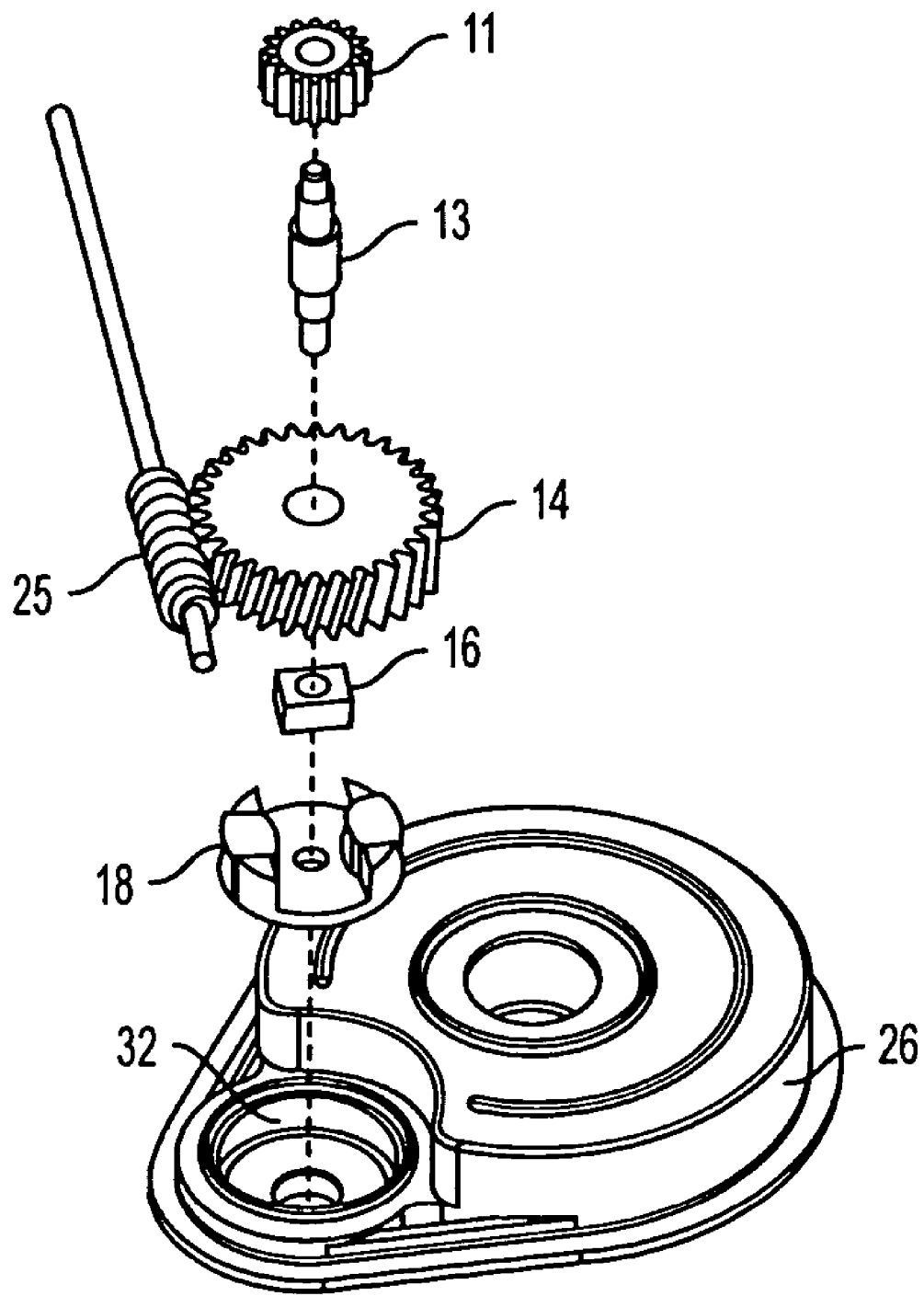
FIG. 5 is top exploded view of the transmission structure of FIG. 4.
Figure 6:
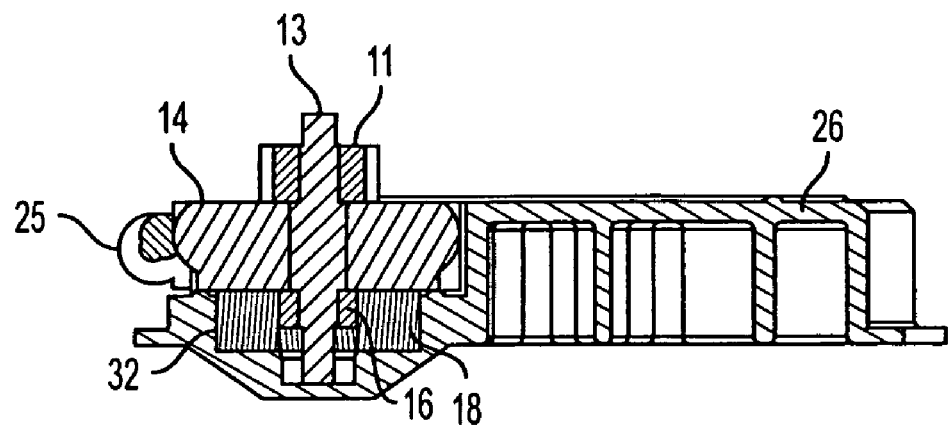
FIG. 6 is a sectional view of the transmission structure of FIG. 4 as viewed in the direction of arrow C.
Figure 7:
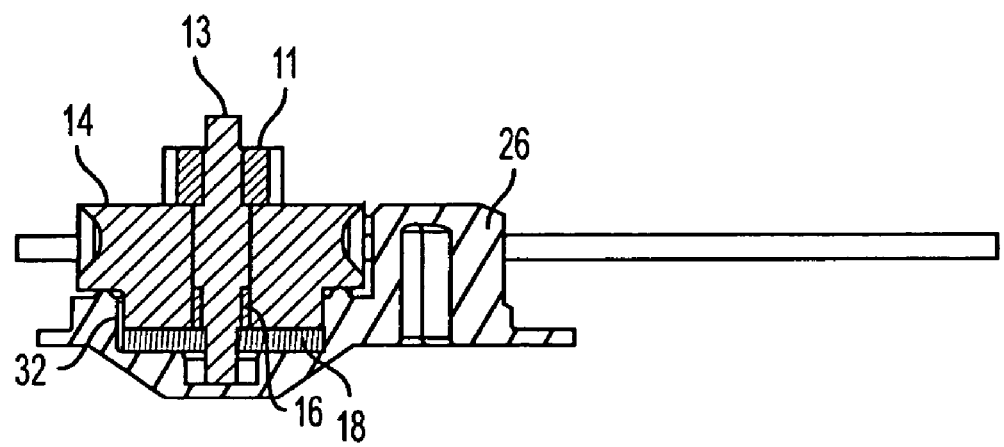
FIG. 7 is a sectional view of the transmission structure of FIG. 4 as viewed in the direction of arrow D.

With reference to FIGS. 4 and 5, the clutch assembly 10 can be mounted with respect to a housing 26 of a motor, such as a conventional windowlift motor for a vehicle, so that a worm 25 meshes with the gear of the input structure 14. FIG. 6 is a sectional view of the transmission structure of FIG. 4 as viewed in the direction of arrow C. FIG. 7 is a sectional view of the transmission structure of FIG. 4 as viewed in the direction of arrow D.

Figure 2:
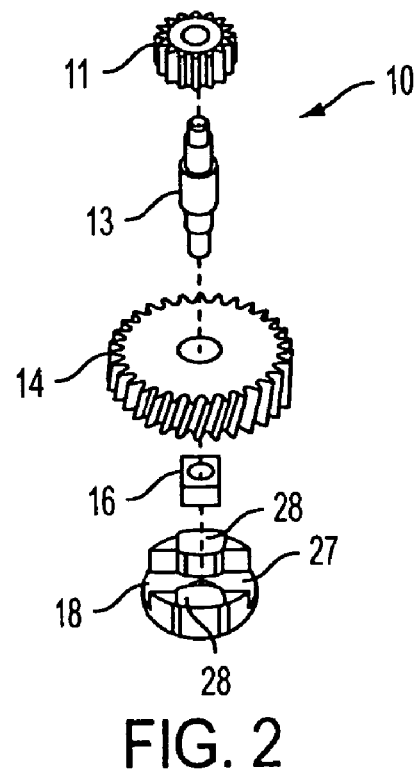
FIG. 2 is a top exploded view of the clutch assembly of FIG. 1.

As best shown in FIGS. 1 and 2, the clutch plate 18 includes two followers 28 disposed in opposing relation and extending from base 27 of the clutch plate 18. The followers 28 are preferably molded as an integral part of the clutch plate 18, but the followers 28 can be fully detached from the clutch plate 18.

If a motor armature (not shown) is the driving element (normal operation), the input structure 14 will be driven by another component, be it the worm 25, a gear, or a belt (in the case of a belt drive). The clutch plate 18, with its followers 28, and the cam 16 have the same relative angular position relative to each other. Thus, as shown in FIG. 8, the surfaces 29 of the engagement members 23 of the input structure 14 contact an associated cam side 30. As a result, there is no radial force acting on the followers 28 thus, allowing the motor to operate as intended, where the cam 16 moves the shaft 13 and thus the output structure 11. The output structure 11 can then transfer its motion to another member (not shown).

The clutch plate 18 is "floating" relative to all other components and will freely spin when the motor armature is the driving element. The engagement members 23 of the input structure 14 engage the clutch plate 18 and cam 16 simultaneously, maintaining the alignment of the followers 28 with respect to the cam 16.

In an initial back drive condition, as shown in FIG. 9, when the output structure 11 becomes the driving element, the shaft 13 will turn along with the cam 16. Torque on the shaft 13 causes the cam 16 to rock with respect to apexes 35 of the engagement members 23 of the input structure 14 and thereby engages the followers 28 via ends 34 of the cam 16. Since the rectangular cam 16 is rotated the followers 28 are pressed on the inner race 32 (housing inner diameter surface, FIG. 5), locking the shaft and thus the motor due to friction, preventing back drive. The followers 28 are capable of being moved and pressed to the inner race 32 due to the thin, flexible bridging portions 36 connecting the followers 28 to the clutch plate 18.

In general, the clutch assembly 10 can be used in any application involving the use two stage or larger transmission. This assembly 10 was configured with automotive windowlift applications in mind.

The desired effect of the use of this clutch assembly is that an increase in the gearing efficiency allows for a smaller motor design, with the desired reduction in system costs due to low part count.

The clutch assembly 10 becomes operational on both angular directions as long as the input structure 14 is the driving element. If the output structure 11 becomes the driving element, the clutch function will effectively prevent angular displacement in both directions.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A clutch assembly for use in a housing having a race surface, the clutch assembly comprising:

a shaft, an output structure fixedly coupled to the shaft, the output structure being constructed and arranged to transmit motion thereof to another member, a cam fixedly coupled to the shaft, a clutch plate mounted on the shaft for rotation with respect to the shaft, follower structure operatively associated with the cam, and an input structure mounted with respect to the shaft for rotation with respect to the shaft, the input structure being associated with the cam and the follower structure, the input structure being constructed and arranged to receive, in a normal operating condition, an input motion such that rotation of the input structure causes rotation of the cam and shaft so as to drive the output structure, wherein during a back drive condition of a motor, when the output structure is driving and torque is transmitted to the shaft and thus to the cam, the cam causes the follower structure to contact and exert pressure on the race surface thereby preventing rotation of the shaft.

2. The assembly of claim 1, wherein each of the output structure and input structure includes a gear.

3. The assembly of claim 1, wherein the input structure includes a pair of engagement members disposed in spaced relation with the cam there-between, each engagement member having a pair of top surfaces, with the top surfaces meeting to define an apex.

4. The assembly of claim 3, wherein when the input structure is driven, the engagement members are constructed and arranged such that a top surface of each engagement member contacts the cam, permitting the clutch plate to rotate freely.

5. The assembly of claim 4, wherein the cam is of generally rectangular configuration.

6. The assembly of claim 3, wherein during the back drive condition when the output structure is a driving element, the torque on the shaft causes the cam to rotate with respect to the apexes and thereby engage the follower structure causing the follower structure to press on the race surface, locking the shaft.

7. The assembly of claim 6, wherein the cam is of generally rectangular configuration.

8. The assembly of claim 6, wherein the follower structure includes a pair of followers associated with the clutch plate.

9. The assembly of claim 8, wherein each follower is connected to the clutch plate by at least one flexible bridging portion, the bridging portions being constructed and arranged to permit the followers to move to engage the race surface when the followers are engaged by the cam.

10. A clutch assembly for use in a housing having a race surface, the clutch assembly comprising:
   a shaft,
   output means, fixedly coupled to the shaft, for transmitting motion thereof to another member,
   a cam fixedly coupled to the shaft,
   a clutch plate mounted on the shaft for rotation with respect to the shaft,
   means for pressing operatively associated with the cam, and
   input means, mounted with respect to the shaft for rotation with respect to the shaft and being associated with the cam and the means for pressing, for receiving, in a normal operating condition, an input motion such that rotation of the input means causes rotation of the cam and shaft so as to drive the output means,
   wherein during a back drive condition of a motor, when the output means is driving and torque is transmitted to the shaft and thus to the cam, the cam causes the means for pressing to contact and exert pressure on the race surface thereby preventing rotation of the shaft.

11. The assembly of claim 10, wherein each of the input means and output means includes a gear.

12. The assembly of claim 10, wherein the input means includes a pair of engagement members disposed in spaced relation with the cam there-between, each engagement member having a pair of top surfaces, with the top surfaces meeting to define an apex.

13. The assembly of claim 12, wherein when the input means is driven, the engagement members are constructed and arranged such that a top surface of each engagement member contacts the cam, permitting the clutch plate to rotate freely.

14. The assembly of claim 13, wherein the cam is of generally rectangular configuration.

15. The assembly of claim 12, wherein during the back drive condition when the output structure is a driving element, the torque on the shaft causes the cam to rotate with respect to the apexes and thereby engage the means for pressing causing the means for pressing to press on the race surface, locking the shaft.

16. The assembly of claim 15, wherein the cam is of generally rectangular configuration.

17. The assembly of claim 15, wherein the means for pressing includes a pair of followers associated with the clutch plate.

18. The assembly of claim 17, wherein each follower is connected to the clutch plate by at least one flexible bridging portion, the bridging portions being constructed and arranged to permit the followers to move to engage the race surface when the followers are engaged by the cam.

19. A method of controlling back drive in a motor, the motor including an a housing having a race surface, the method including:
   providing a clutch assembly having a shaft; an output structure fixedly coupled to the shaft; the output structure being constructed and arranged to transmit motion thereof to another member, a cam fixedly coupled to the shaft; a clutch plate mounted on the shaft for rotation with respect to the shaft; follower structure operatively associated with the cam, and an input structure mounted with respect to the shaft for rotation with respect to the shaft, the input structure being associated with the cam and the follower structure, the input structure being constructed and arranged to receive an input motion such that rotation of the input structure causes rotation of the cam and shaft so as to drive the output structure,
   during a back drive condition of the motor, when the output structure is a driving element and when torque is transmitted to the shaft and thus to the cam, permitting the cam to cause the follower structure to contact and exert pressure on the race surface thereby preventing rotation of the shaft, and
   during a normal operating condition of the motor, when the input structure is driven, preventing the follower structure from contacting the race surface, thereby permitting the shaft to rotate freely.

20. The method of claim 19, wherein the step of providing the cam includes providing a cam of generally rectangular configuration.

21. The method of claim 19, where the step of providing the follower structure includes providing a pair of followers associated with the clutch plate.

22. The method of claim 21, wherein each follower is connected to the clutch plate by at least one flexible bridging portion, the bridging portions being constructed and arranged to permit the followers to move to engage the race surface when the followers are contacted by the cam.

* * * * *